W. W. HURLBUT.
METHOD OF HANGING AND ADJUSTING CIRCULAR SAWS.
No. 14,241.
PATENTED FEB. 12, 1856.
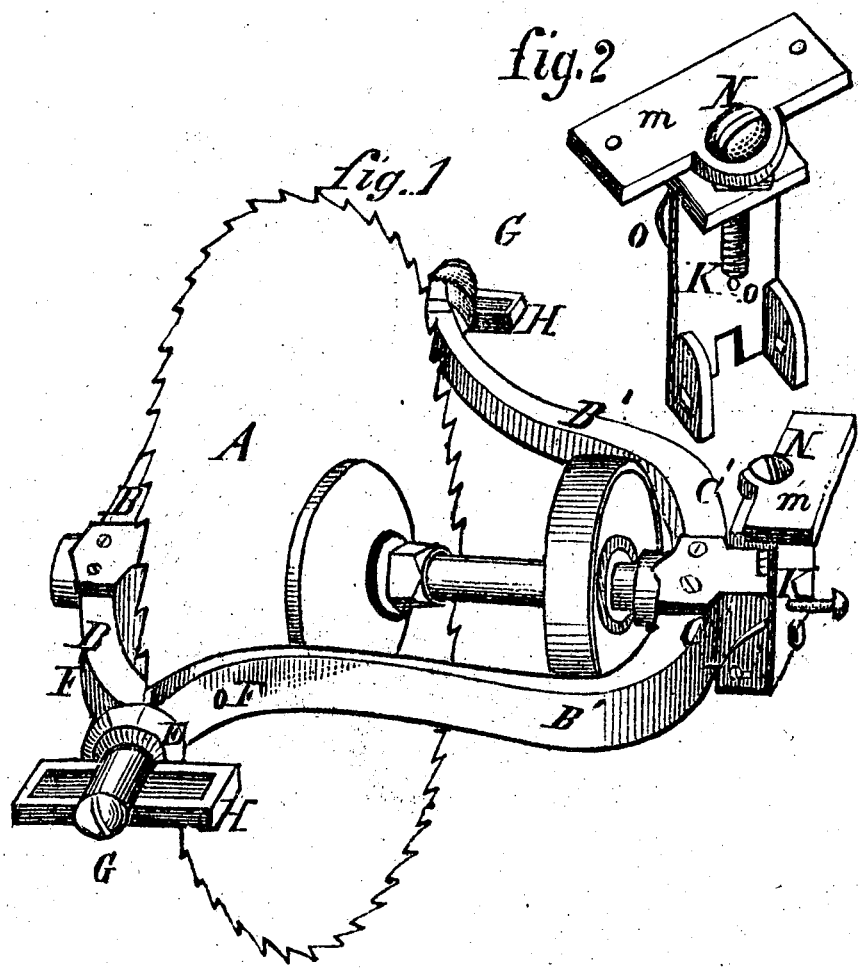

UNITED STATES PATENT OFFICE.

WESTEL W. HURLBUT, OF UTICA, NEW YORK.

METHOD OF HANGING AND ADJUSTING CIRCULAR SAWS.

Specification of Letters Patent No. 14,241, dated February 12, 1856.

*To all whom it may concern:*

Be it known that I, WESTEL W. HURLBUT, of the city of Utica, in the State of New York, have invented certain new and useful Improvements in Hanging and Adjusting Circular Saws for Resawing Lumber and other Purposes; and I do hereby declare that the following is a full and exact description of the construction and operation of the same, reference being had to the annexed drawings, making a part of this specification, like letters or figures referring to the same parts of the machine, of which—

Figure 1, is a perspective view, showing the saw A, and the bearing of the shaft D, as at C, C', which are connected with the arms B, B, and B', B', extending past the extreme edges of the saw and are connected together at E, E, their extreme ends. At F, F, in the arms, are screws serving as guides to the saw at A.

G, G, are pins or centers passing through the slotted bars, H, H, into the extreme ends of the arms, B, B, B', B'.

I, is a wedge serving to open or spread the boards, after they pass the saw A, and is connected, with the arms at E'.

K is a slide through which the bolt L, passes, connecting it with the box or bearing at C'.

M in Figs. 1 and 2, is a stationary bar through which the bolt H, passes into the slide K.

The apparatus, Fig. 1, may be suspended and arranged, for use, by placing the slotted bars H, H, upon suitable bearings, in a frame, and secured by bolts in the slots of those bars.

The slide K, is placed between ways or guides, which are attached to the frame. The bar M, is also firmly bolted to the top of the frame above the slide K.

The saw A, the wedges I, and saw guides F, F, as arranged, may be set for sawing the lumber obliquely, or square, by raising or lowering the bearing C', by means of turning the bolt H, to the desired height.

The bolt O, in Figs. 1 and 2, passing through the slide K, into the bearing C', is used to set the saw, guides, and wedges in the desired position sidewise, each being adjusted at one and the same time. The bearing C, at this opposite end of the shaft D, from the slide K, has no connection with the frame, upon which the whole is placed, other than at the extreme ends of the arms, at E, E, as before described.

What I claim as of my invention and improvement, in the within described machine and for which I desire to obtain a patent, is as follows:

1. The arms B, B, and B', B', as connected with the bearings C, C, and supported by the pins, or centers G, G, in connection with the slide K.

2. The moving of the saw A, either sidewise or diagonally, by the use of the slide K, and the bolts O, and N, or their equivalents.

WESTEL W. HURLBUT.

Witnesses:
   SETH. C. HURLBUT,
   WM. DENT.